Nov. 27, 1923.
E. G. SIMPSON
1,475,414
DETACHABLE ARMREST
Filed May 26, 1922
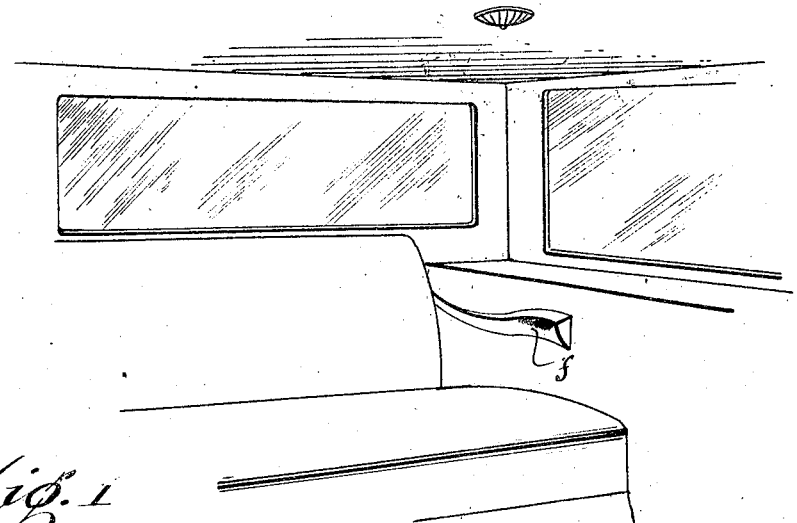
Fig. 1
Fig. 2
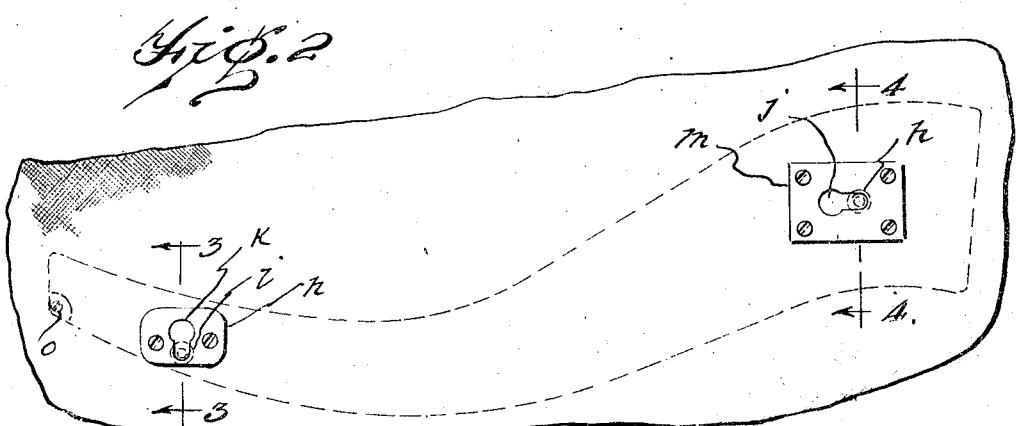
Fig. 4
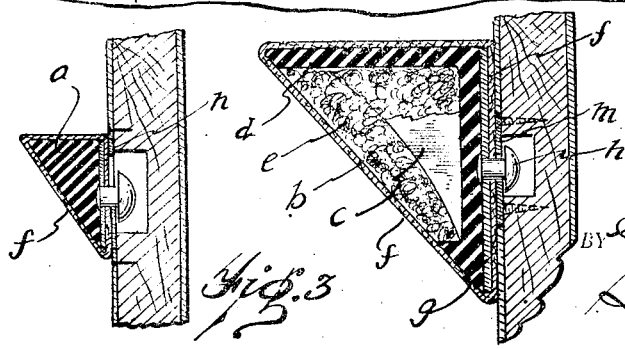
Fig. 3
INVENTOR.
Emory Glenn Simpson
BY Stuart C. Barnes
ATTORNEY.

Patented Nov. 27, 1923.

1,475,414

UNITED STATES PATENT OFFICE.

EMORY GLENN SIMPSON, OF DETROIT, MICHIGAN, ASSIGNOR TO FISHER BODY CORPORATION OF DETROIT, MICHIGAN, A CORPORATION OF NEW YORK.

DETACHABLE ARMREST.

Application filed May 26, 1922. Serial No. 563,768.

*To all whom it may concern:*

Be it known that I, EMORY GLENN SIMPSON, a citizen of the United States, residing at Detroit, in the county of Wayne and State of Michigan, have invented certain new and useful Improvements in Detachable Armrests, of which the following is a specification.

This invention relates to arm rests intended for use primarily with automobile closed bodies. In a prior application of Albert W. Smith Serial #554,137 there is described and claimed arm rests made of soft distortable material which permit an occupant of the seat of an automobile to rest against the arm rest without suffering any inconveniences or discomfort. The present invention is an improvement on this arm rest. However, it is applicable to an arm rest whether made out of solid or hard material or whether it is made of distortable material.

It is the object of the invention to provide a detachable arm rest which will permit the arm rest board of the car to be trimmed completely without any reference to the arm rest. The arm rest may then be trimmed separately and detachably fastened in place as later described.

In the drawings:—

Fig. 1 is an inside elevation of the rear quarter and back of a closed body.

Fig. 2 is a view showing in phantom lines, the arm rest and how the same can be detachably secured to the arm rest board.

Fig. 3 is a section on the line 3—3 of Fig. 2.

Fig. 4 is a section on the line 4—4 of Fig. 2.

The arm rest is preferably made largely of distortable material. This is fully described and claimed in a prior application of Albert W. Smith, Serial #554,137. Suffice it to say here that the core of the arm rest is made of soft moulded rubber *a*. The forward part of the arm rest has the core recessed as at *b* with ribs *c* running down into the recess as a support for the overlying or top portion *d*. This recess *b* is filled with a good grade of curled hair *e*. The trimming *f* is drawn over the core as is shown plainly in Figs. 3 and 4.

In the construction described in the previous Smith application it was necessary to secure the core to the arm rest board by tacks or screws. These had to be applied before the trimming was secured over the arm rest proper. This required the trimming of the arm rest after it had been placed on the job. With my present construction the arm rest is completely trimmed before it is attached to the arm rest board.

A back plate *g* the same shape as the core is vulcanized to the rubber and the trimming cover *f* is sewed together to form a complete envelope to enclose the arm rest. This back plate is provided with a pair of studs *h* and *i*. The studs both have large heads which can be passed through the large openings *j* and *k* respectively in the keeper plates *m* and *n* which are secured by screws to the arm rest board over mortises therein.

The detachable securing of the arm rest to the arm rest board is therefore easy. The stud *h* is passed through the large opening in the slot of the keeper plate *n*. It is then pushed to the right under the restricted opening which prevents it from coming out. The stud *i* is now passed through the opening *k* in the keeper plate *n* and then swung down into the narrow portion of the slot. This locks the other end of the arm rest to the board. It will be seen that the two slots have their axes at right angles to each other so that one stud may be anchored in the keeper by pushing it into the keeper and then forward and the other stud anchored in its keeper by pushing it into the keeper and then pushing it downward in a direction at right angles to the movement in which the first stud was anchored into its keeper. Preferably after these two studs have been anchored in the keeper plates a small screw *o* may be inserted in the socket for that purpose at the end of the arm rest to prevent the rear end of the arm rest lifting up so that the anchored studs can become disengaged from the keeper plates.

What I claim is:

1. In a vehicle body, a vertical arm rest board provided with a socket and a keeper plate having a slot with an enlarged end leading into the socket, an arm rest provided with a vertical face arranged to abut against the side of the arm rest board and provided with a headed stud secured to such face adapted to detachably engage through the keeper plate and in the socket to afford a concealed fastening when the arm rest is in place.

2. In a vehicle body, the combination of a vertical arm rest board provided with a pair of keeper sockets and keeper members said arm rest board being completely trimmed, a separately trimmed arm rest provided with a vertical face arranged to abut against the side of the arm rest board after the same has been trimmed and provided with a pair of locking members adapted to be detachably engaged with the upper members each requiring a separate movement of the arm rest with respect to the arm rest board, the said locking device being concealed when the arm rest is in place.

3. In a body construction, the combination of a vertical arm rest support provided on the side thereof with a pair of keepers having slots with their axes at substantially right angles to each other, said slots having each a large opening communicating with a restricted opening, and an arm rest provided with headed studs arranged to separately pass through the large openings of the slots and then be pushed and anchored under the restricted openings in the slots by separate movement in directions substantially right angular to each other.

4. In a body construction, the combination of a vertical arm rest support, an arm rest comprising a rubber core with a metal back plate vulcanized thereto, and means for securing the back plate to the support.

In testimony whereof I affix my signature.

EMORY GLENN SIMPSON.